J. C. F. LAWRENCE.
AERATING MACHINE.
APPLICATION FILED MAY 19, 1910.
1,000,182.
Patented Aug. 8, 1911.
3 SHEETS—SHEET 3.
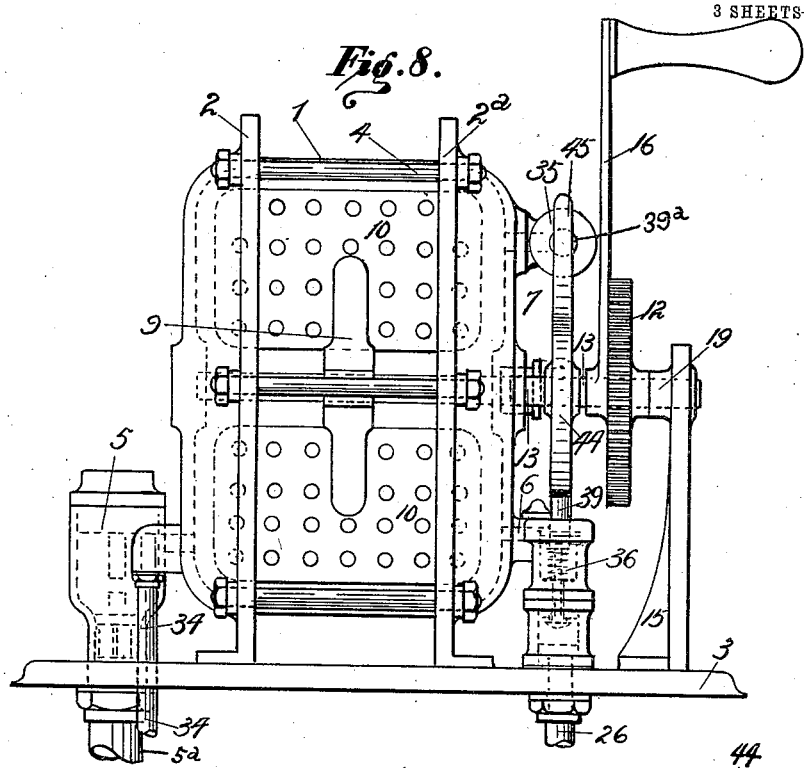
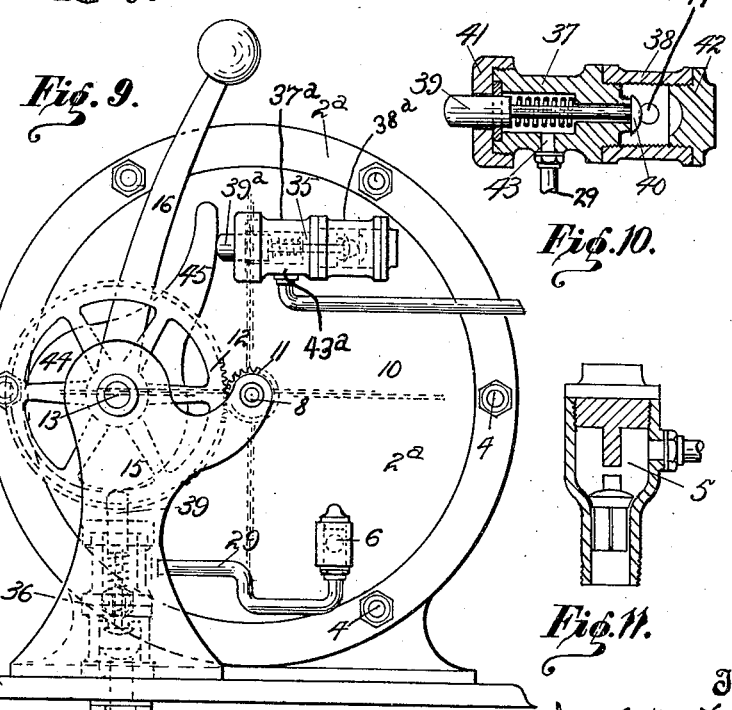

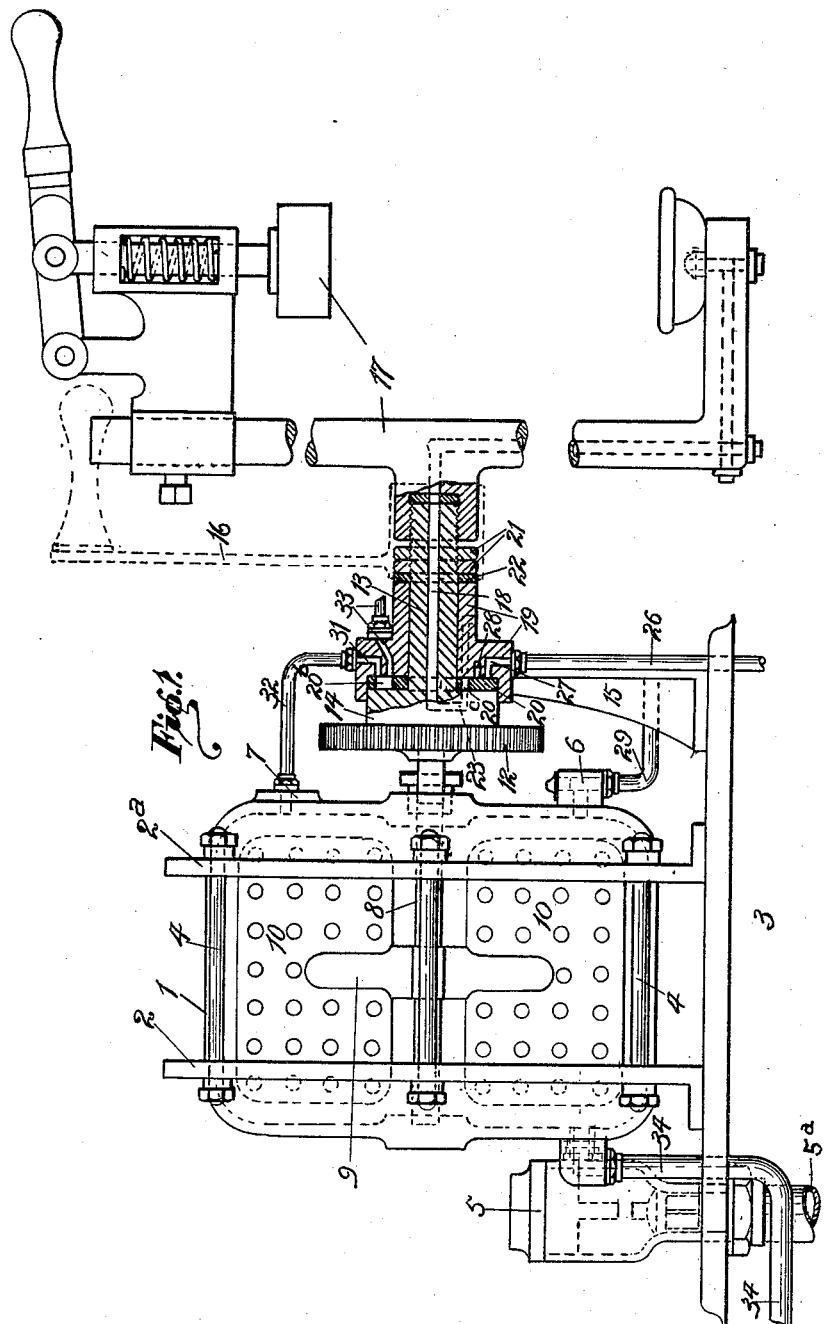

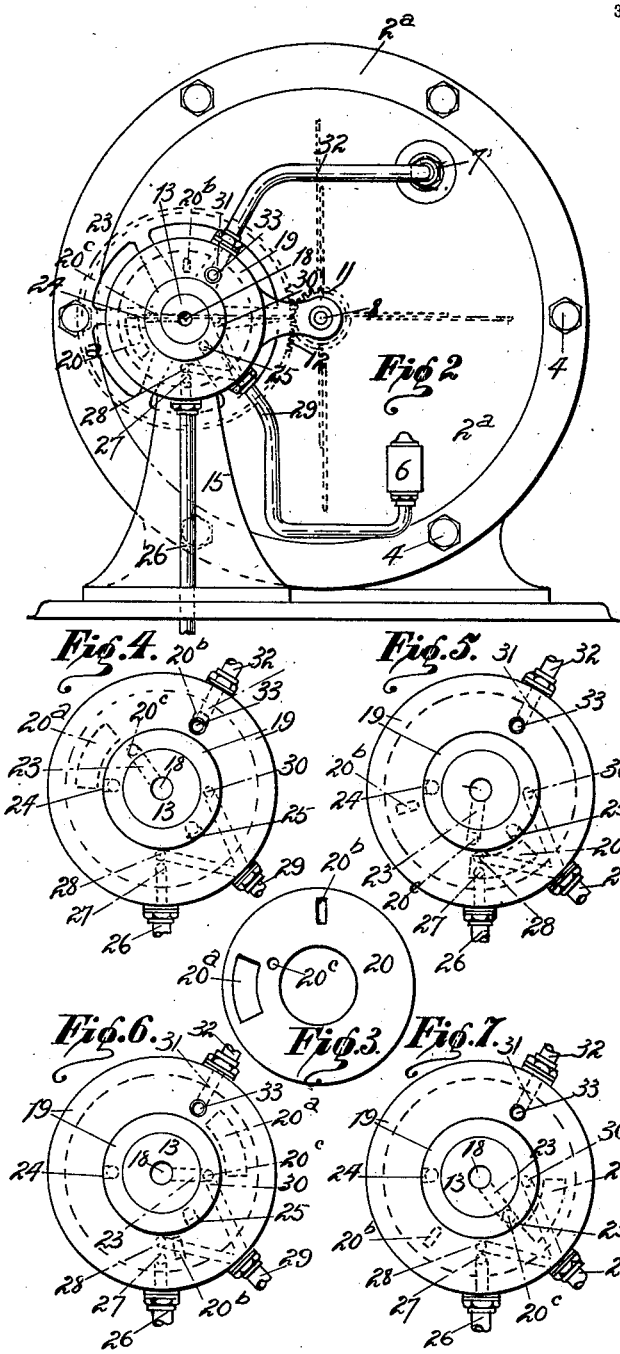

UNITED STATES PATENT OFFICE.

JOSIAH CHARLES FREDERICK LAWRENCE, OF PRAHRAN, NEAR MELBOURNE, VICTORIA, AUSTRALIA, ASSIGNOR OF ONE-HALF TO JOHN DIXON, OF PRAHRAN, NEAR MELBOURNE, AUSTRALIA.

AERATING-MACHINE.

1,000,182.  Specification of Letters Patent.  Patented Aug. 8, 1911.

Application filed May 19, 1910. Serial No. 562,246.

*To all whom it may concern:*

Be it known that I, JOSIAH CHARLES FREDERICK LAWRENCE, a citizen of the Commonwealth of Australia, residing at 193 High street, Prahran, near Melbourne, in the State of Victoria and said Commonwealth of Australia, have invented a new and useful Aerating-Machine, of which the following is a specification.

This invention consists of a simple and inexpensive machine for aerating liquids and will be found to prove especially useful for hotel bars, cafés, house use and the like, and more particularly in places located any considerable distance from manufacturers of aerated waters.

In order that the invention may be readily understood it will be described with reference to the accompanying drawings, in which:—

Figure 1 is a sectional front elevation of an apparatus embodying the invention. Fig. 2 is an end elevation of the apparatus illustrated in Fig. 1, but with the bottling rack removed. Fig. 3 illustrates a certain washer hereinafter described. Figs. 4–7 are diagrammatic views illustrating the movements which control the gas and water supply. Figs. 8 and 9 illustrate a modification of the invention, while Figs. 10 and 11 are sectional views of certain valves hereinafter described.

1 represents a cylindrical reservoir, preferably, of stout glass clamped between two end frames or standards 2, 2ª, rubber or other suitable packing being inserted between said cylinder and said frames to insure a tight joint being maintained. These frames or standards 2, 2ª may be fastened to a bed plate 3 and are clamped against the glass or other cylinder 1 by bolts 4 as shown.

The water or other supply of liquid to be aerated is conveyed to the reservoir 1 through a valve 5 and pipe 5ª which allows such liquid to enter said reservoir when the pressure in same is released. A gas inlet 6 leads into the lower part of the reservoir and a snift 7 leads from the upper part thereof into a waste tub or elsewhere. A spindle 8 passes through the center of the reservoir 1. On this spindle is arranged an agitator 9 or set of beaters or dashers, preferably consisting of perforated metal or other blades 10, which revolve with said spindle 8, within said reservoir and serve to agitate the mixture of water and gas in said reservoir. The spindle 8 is equipped at one end with a pinion 11 which meshes with and is driven by a gear wheel 12 on a spindle 13 mounted on a suitable standard or support 15 and operated either by a lever arm 16 as shown in Figs. 8 and 9 and by dotted lines in Fig. 1 or by a bottling rack as shown at 17 in the last mentioned figure.

In the particular construction of machine illustrated in Fig. 1 the spindle 13 is formed with a shoulder 14 and has a longitudinal central channel 18 for the passage of the liquid to the bottling rack 17 as illustrated in said Fig. 1. The spindle 13 is mounted in a sleeve or bearing 19 and a leather or other washer 20 is provided to make a gas tight joint between the shoulder 14 of said spindle 13 and the sleeve 19. Nuts 21 and a washer 22 are provided upon the spindle 13 for adjusting same, in its sleeve or bearing 19. The washer 20 is formed with a large and small slot or port 20ª, 20ᵇ respectively and a small hole or opening 20ᶜ as illustrated in Fig. 3, and said washer is attached to the shoulder 14 of the spindle 13 so as to revolve with same. A port or channel 23 is formed in the shoulder 14 of the spindle 13 and connects the central passage 18, with the opening 20ᶜ in the washer 20. This port 23 during the rotary movement of the spindle 13 communicates with ports 24, 25 formed in the sleeve 19 and which open to the atmosphere or lead to a waste tub. These ports are illustrated in Figs. 4 to 7 and are adapted to snift the bottle during the filling operation.

A pipe 26 leads from the usual reducing valve on the gas reservoir or bottle to a port 27 in the sleeve 19. A port 28 formed in the sleeve 19 leads to a pipe 29 connected to the lower part of the reservoir. These ports are in the path of travel of the slot 20ª of the washer 20 and at a certain time during the rotary movement of said washer the ports open into the slot 20ª and gas is permitted to pass to the reservoir by means of the connecting pipe 29. Another channel or port 30 also formed in the sleeve 19 leads from said pipe 29 and communicates with the port 23 leading to the channel or passage 18 formed in the spindle 13, when said spindle is in a certain position during its rotary movement as will be hereinafter described. When these ports 30 and 23 are both open the water is forced by the gas pressure in the reservoir through the connecting pipe 29 the ports 30 and 23 through the central channel or passage 18 in the spindle 13 to the bottle rack 17. Another port 31 in the sleeve 19 connects by a pipe 32 with the upper part of the reservoir 1. This port at a certain interval during the rotary movement of the spindle communicates by means of the slot $20^b$ in the washer 20, with another port 33, leading to the atmosphere and thereby snifts the reservoir thus allowing water to enter said reservoir through the valve 5.

The bottling rack 17, is attached to the end of the spindle 13 in any approved manner.

The operation of the apparatus with the bottle rack attached as illustrated in Fig. 1 will now be described.

With the bottle rack in its normal position, the positions of the openings $20^a$, $20^b$ and $20^c$ in the washer 20 on the spindle 13, with regard to the various ports, would be approximately as illustrated by the dotted lines in Fig. 2. The first operation of the bottle rack is to snift the reservoir and allow same to fill with water. This is done by a slight backward movement of the bottle rack which as illustrated in Figs. 1 and 4 brings the slot $20^b$ in the washer 20 over the two ports 31 and 33 thereby opening the reservoir 1 to the atmosphere and releasing any pressure that may be in said reservoir. This allows the water, or other liquid to be aerated, to enter the reservoir 1 through the valve 5. The bottling rack is then turned forwardly thus bringing the slot $20^a$ over the ports 27 and 28 placing said ports in open communication with each other and allowing the gas to pass to the reservoir 1 through the pipe 29. The rack is then given a backward movement in order to thoroughly mix the water and gas by means of the agitator or beaters 10 attached to the spindle 8, to which a rotary motion is imparted by means of the gear wheel 12 meshing with the pinion 11 on the end of the spindle 8. The next movement of the bottle rack brings the slot $20^a$ in the washer 20 beyond the gas inlet ports 27 and 28 thus closing same and opening 30 which communicates at the same time with the opening $20^c$ and the port 23 leading to the central passage or channel 18 formed in the spindle 13. This allows the water to pass from the reservoir under pressure through the connecting pipe 29 (which pipe also acts in its turn as the gas inlet pipe) through the port 30 opening $20^c$, and port 23, to the central passage or channel 18 and thence to the bottle rack where the liquid enters the bottle until said bottle is nearly full. This movement is illustrated in Fig. 6. In order to snift the bottle a slight backward movement is given to the bottling rack 17 until the port 23 in the spindle 13 is brought into communication through the opening $20^c$, with a port 25 which opens to the atmosphere as illustrated in Fig. 7. The next movement brings the ports 23 and 30 to the position illustrated in Fig. 6 when the bottle is completely filled. The rotary movement of the bottle rack continues until it has made one complete revolution, when the bottle will again be in its inverted position. The port 23 is then in communication through the opening $20^c$ with the port 24 which is open to the atmosphere and finally snifts the channel 18 leading to the bottle which allows the marble to fall on to its seat where it is held by the pressure of the gas contained in the bottle which is now removed from the bottling rack 17. The pressure of gas in the reservoir prevents any water entering through the valve 5 until said reservoir is snifted. This snift occurs as the slots $20^a$ and $20^b$ open the ports, 31 and 33 on their return to the starting position, when a further supply of water enters the reservoir. Should it not be desired to use the bottling rack 17 it may be removed from the spindle 13 and a screw or other cap provided to close the end of the passage or channel 18 in said spindle. A lever or handle 16 may be provided on the end of said spindle as illustrated by dotted lines in Fig. 1 to operate the apparatus and the aerated water may be drawn off from a pipe 34 leading from the reservoir to a bar counter or to a syphon head as may be desired.

In the modification of the apparatus illustrated in Figs. 8 and 9 two separate valves 35 and 36 are provided in lieu of the face valve illustrated in Figs. 3 to 7. The valve 36 illustrated in Fig. 10 consists of two compartments 37 and 38 the opening from one to the other being normally closed by means of a spring controlled spindle 39 having at one end a mushroom or other shaped head 40 which normally closes the passage between said compartments. A screw cap 41 with a central opening which acts as a guide for the spindle or pin 39 closes the end of the compartment 37 and a screw plug 42 closes the other end of the valve as illustrated. The gas supply pipe is connected with compartment 38 at 44 and the compartment 37 is provided with a passage 43 connected by a pipe 29 with the gas inlet 6 of the reservoir. The valve 35 is similar in construction to the valve 36 and communicates with the reservoir and serves to snift same by means of a connection leading to the chamber $38^a$ thereof and when the pin or spindle $39^a$ is pushed in the valve is opened and the gas is permitted to escape through a hole 43ª formed in the compartment 37ª thereof and opening to the atmosphere. In the operation of this form of the invention the lever 16 is given a semi-rotary movement. An eccentric cam 44 having a projecting arm 45 and mounted on the spindle 13 in the first movement of the lever or handle 16 bears against the spindle or pin 39ª of the valve 35 thus snifting the reservoir and allowing the water to enter said reservoir through the inlet valve 5, details of construction of which are shown in Fig. 11. On the downward movement of the lever or handle 16 the eccentric cam bears downwardly upon the spindle or pin 39 of the valve 36 which connects the reservoir with the gas supply opening said valve and allowing a certain quantity of gas to enter the reservoir, at the same time revolving the agitator 10 thus agitating and aerating the water which is drawn off as required from a siphon head or other tap connected to the reservoir by means of pipe 34, or the connecting pipe 34 may be led to a draft arm arranged on the counter in a hotel bar or a shop or it may be led to any other suitable outlet.

It will be evident that instead of the beaters 10 being rotated or partially rotated in a stationary cylinder the beaters might be fixed and the aerating cylinder might be arranged so that it could be rotated or partially rotated so as to agitate and mix the contents.

Other details of construction might also be varied without departing from the essential features of the invention.

An apparatus embodying this invention occupies about one square foot of space, and may be placed upon a bar or counter and may be used as a continuous siphon.

It may also be adapted to the ordinary soda fountain in which case it would dispense with the use of the large and cumbersome metal cylinders at present in use, and in which the pressure of the liquid becomes reduced as it is drawn off. It also does away with much of the labor attending the charging of soda fountains.

Owing to its small size and weight the apparatus is portable and can be temporarily installed wherever desired.

The herein described apparatus is also eminently adaptable for use on board ship as it obviates the necessity for carrying large quantities of bottle aerated waters.

Having now fully described and ascertained my said invention and the manner in which it is to be performed, I declare that what I claim is;—

1. In an aerating machine, the combination with a liquid receptacle provided with a liquid inlet and also with a snifting outlet and also with a discharge for aerated liquid, of a rotary agitator within said receptacle, a rotary part connected with said agitator and provided with a snifting port and also with a gas inlet port and also with a liquid outlet port, a stationary part, coöperating with said rotary part, and provided with a snifting passage and also with a gas passage connected with a gas supply and provided also with a gas passage communicating with said receptacle and provided also with a liquid passage, and means for operating said rotary part.

2. In an aerating machine, the combination with a receptacle provided with a liquid inlet and also with a snifting outlet and also with a discharge for aerated liquid, of a rotary agitator within said receptacle, a rotary part connected with said agitator and provided with a snifting port and also with a gas inlet port and also with a liquid outlet port, a stationary part coöperating with said rotary part and provided with a snifting passage and also with a gas passage connected with a gas supply and provided also with a gas passage communicating with said receptacle and also with a liquid passage, said rotary part being provided with a longitudinal discharge passage and having threaded portions, whereby a handle or bottling rack may be detachably secured thereto.

3. In an aerating machine, the combination with a receptacle provided with a liquid inlet and also with a snifting outlet and also with a discharge for aerated liquid, of a rotary agitator within said receptacle, a rotary part connected with said agitator and provided with a snifting port and also with a gas inlet port and also with a liquid outlet port, a stationary part coöperating with said rotary part and provided with a snifting passage and also with a gas passage connected with a gas supply and provided also with a gas passage communicating with said receptacle and also with a liquid passage, said rotary part being provided with a longitudinal passage, and a bottling rack secured to said rotary part and provided with a passage communicating with said longitudinal passage, the said rotary part being also provided with an additional bottle snifting port, communicating with said longitudinal passage.

4. In an aerating machine, the combination with a receptacle provided with a liquid inlet and also with a snifting outlet and also with a combined gas inlet and aerated liquid outlet, of a stationary part having a bearing portion provided with a snifting port connected with the snifting aperture of the receptacle said bearing portion being also provided with a gas inlet port and also with a port communicating with the gas inlet of said receptacle, and a rotary part coöperating with and journaled in said bearing portion of the stationary part and provided with a longitudinal discharge passage and also with a snifting port adapted to be brought into registration with the snifting port of the stationary part, said rotary part being also provided with a gas inlet port adapted to connect the gas port of the stationary part with the gas inlet port, said rotary part being also provided with a port for connecting said receptacle with said longitudinal discharge passage.

5. In an aerating machine, the combination with a receptacle provided with a liquid inlet and also with a snifting outlet and also with a combined gas inlet and aerated liquid outlet, of a stationary part having a bearing portion provided with a snifting port connected with the snifting aperture of the receptacle, said bearing portion being also provided with a gas inlet port and with a port communicating with the gas inlet of the receptacle, a rotary part coöperating with and journaled in said stationary part and provided with a longitudinal discharge passage and also with a snifting port adapted to be brought into registration with the snifting port of the stationary part, said rotary part being also provided with a gas inlet port adapted to connect the gas port of the stationary part with the gas inlet of the receptacle and being also provided with a port for connecting the said receptacle with the longitudinal discharge passage and being also provided with a snifting port for the longitudinal discharge passage, and a bottling device carried by said rotary part and having a passage communicating with the said longitudinal discharge passage.

6. In an aerating machine, the combination with a receptacle provided with a liquid inlet and also with a snifting outlet and also with a combined gas inlet and liquid discharge, of a rotary agitator in said receptacle, a stationary bearing located exteriorly to said receptacle and provided with a gas inlet port and also with a port connected with the combined gas inlet and liquid discharge of the receptacle, said bearing being also provided with a snifting port connected with the snifting outlet of the receptacle, said bearing being further provided with a bottle snifting port, a rotary part mounted in said bearing and operatively connected with the said agitator, said rotary part being provided with a longitudinal discharge passage and also with a snifting port for the receptacle and further provided with a gas inlet port and also with a liquid discharge port and also with a bottle snifting port communicating with said discharge passage, said ports being constructed so as to be brought into registration with the respective ports of the said bearing, a bottling device detachably connected with said rotary part and having a bottle filling passage communicating with the longitudinal discharge passage of said rotary part, and an auxiliary discharge pipe connected with said receptacle.

In witness whereof I have hereunto set my hand in the presence of two witnesses.

JOSIAH CHARLES FREDERICK LAWRENCE.

Witnesses:
 PERCY HEDGES,
 WILLIAM ARMSTRONG.

---

Copies of this patent may be obtained for five cents each, by addressing the "Commissioner of Patents, Washington, D. C."